United States Patent [19]

Tin et al.

[11] 4,314,164
[45] Feb. 2, 1982

[54] COMPUTER CHANNEL ACCESS CIRCUIT FOR MULTIPLE INPUT-OUTPUT DEVICES

[75] Inventors: Kam B. Tin, Burnaby; Stanley R. C. Norman, Brockville, both of Canada

[73] Assignee: GTE Automatic Electric Labs Inc., Northlake, Ill.

[21] Appl. No.: 91,422

[22] Filed: Nov. 5, 1979

[51] Int. Cl.³ ..................... H03K 17/56; H01R 3/00; G11C 7/00
[52] U.S. Cl. .................................. 307/243; 307/41; 307/445; 307/273; 340/825.5; 365/195
[58] Field of Search ............... 307/215, 217, 241, 243, 307/232, 445, 470; 364/120; 365/242; 340/147 LP, 147 C; 371/8; 328/109

[56] References Cited

U.S. PATENT DOCUMENTS

| | | | |
|---|---|---|---|
| 3,107,306 | 10/1963 | Dobbie | 307/215 |
| 3,982,425 | 9/1976 | McLain | 364/120 |
| 4,229,701 | 10/1980 | Bourner | 307/232 |
| 4,249,093 | 2/1981 | Henig | 307/241 |

*Primary Examiner*—Stanley D. Miller, Jr.
*Assistant Examiner*—B. P. Davies
*Attorney, Agent, or Firm*—Robert J. Black; Gregory G. Hendricks

[57] ABSTRACT

An access circuit for use in a computer input-output channel. Retriggerable mono-stable multivibrators are used to provide access timing periods during which an input-output device can access a computer channel to the exclusion of other input-output devices.

6 Claims, 1 Drawing Figure

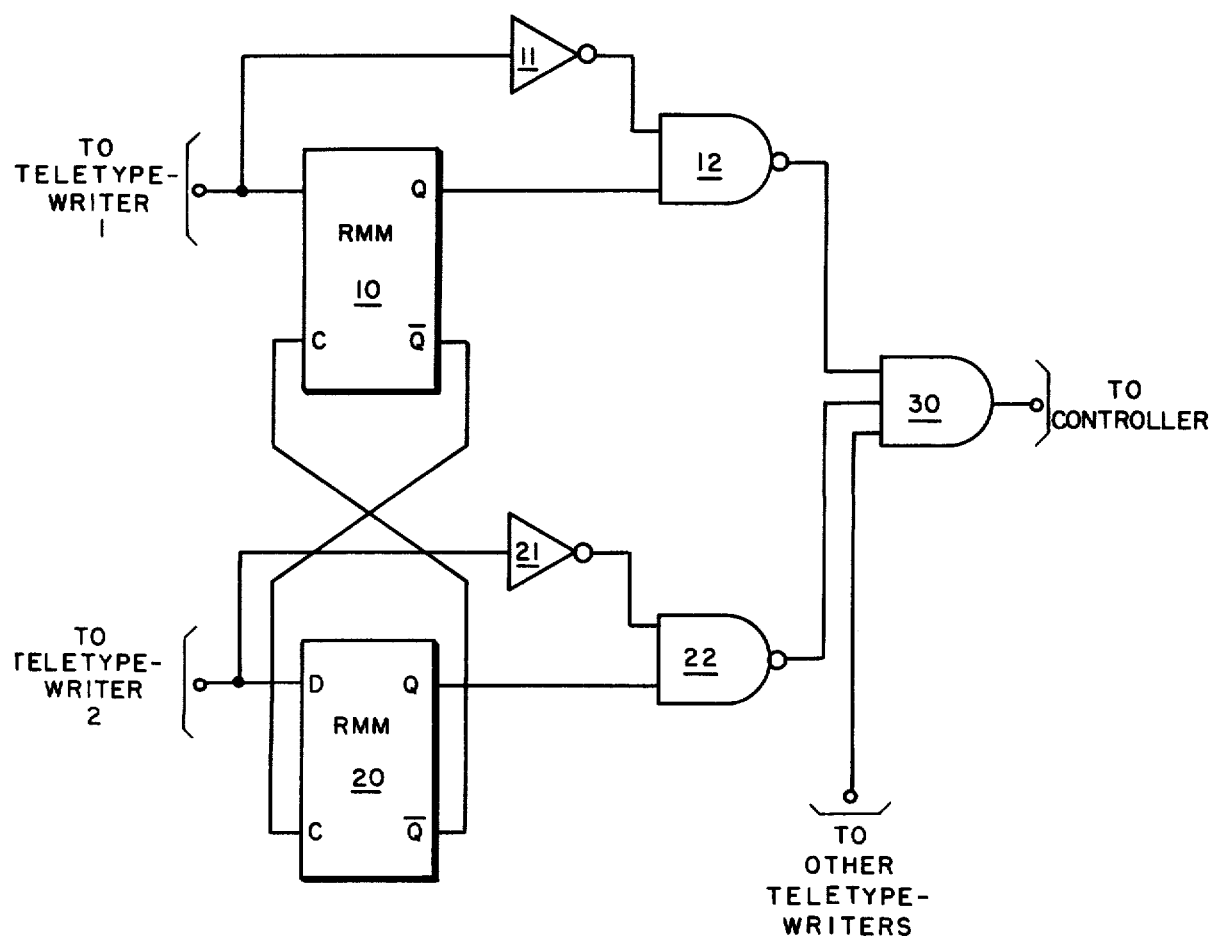

COMPUTER CHANNEL ACCESS CIRCUIT FOR MULTIPLE INPUT-OUTPUT DEVICES

BACKGROUND OF THE INVENTION (1) Field of the Invention

The present invention relates to computer channel access circuits for input-output devices and more particularly to a circuit which controls computer channel access time of input-output devices.

(2) Description of the Prior Art

Input-output devices access a computer through an input-output device controller or channel. This controller transmits access requests and data from the device to the computer and it transmits data to the device from the computer. Multiple devices, such as local and remote teletypewriters, can be connected to one controller to receive data since they will both print the same data. However, only one teletypewriter can transmit data to a controller at a time since the probability that they will both be transmitting the same data at the same time is infinitesimally small.

If two teletypewriters with input capability were connected to one controller, garbled data would be transmitted to the computer if both teletypewriters were transmitting at the same time. A lockout circuit could be provided such that the teletypewriters accessing the controller first, would lockout the other teletypewriter until its communication with the computer was complete. However, this could result in the other teletypewriter being locked out indefinitely.

This problem has been solved in the prior art by connecting an additional controller to the computer for each additional teletypewriter with input capability. However, such a technique is expensive and unnecessary since it requires an additional controller for a remote teletypewriter which will only occasionally require access to the computer.

Accordingly, it is an object of the present invention to provide a novel, low cost technique of providing computer access capability to multiple input-output devices connected to a single device controller.

SUMMARY OF THE INVENTION

The present invention is a circuit which provides computer channel access capability to multiple input-output devices, such as teletypewriters, through a single device controller on a time limit basis.

The circuit consists of a retriggerable mono-stable multivibrator and a first gate circuit connected to each other and to an associated teletypewriter. The outputs of each first gate circuit are connected to a second gate circuit whose output is connected to the device controller.

When a teletypewriter initiates a date transmission, its associated multivibrator enables its associated first gate circuit for five seconds and simultaneously disables the multivibrator associated with other teletypewriters for five seconds. The enabled gate circuit then transmits data from its associated teletypewriter through the second gate circuit to the device controller. At the end of five seconds, the multivibrator times out, disables its associated gate circuit and removes the disable signal applied to the other multivibrators. Whichever teletypewriter is first to initiate the next data transmission will then gain control of the device controller for the next five seconds.

Thus multiple teletypewriters are provided with computer channel access capability through a single device controller.

DESCRIPTION OF THE DRAWING

The single FIGURE of the accompanying drawing is a circuit diagram of a computer channel access circuit for multiple input-output devices in accordance with the present invention.

DESCRIPTION OF THE PREFERRED EMBODIMENT

Referring now to the accompanying drawing the computer channel access circuit of the present invention is shown. Multivibrator 10 is shown connected to an associated teletypewriter and its output is connected to NAND gate 12. Inverter 11 is also connected to multivibrator 10 and to NAND gate 12. Similarly multivibrator 20 is connected to an associated teletypewriter and its output is connected to NAND gate 22. Inverter 21 is also connected to multivibrator 20 and to NAND gate 22. The outputs of NAND gate 12 and NAND gate 22 are connected to AND gate 30 and its output is connected to an input-output device controller.

Initially all teletypewriters have an equal opportunity to enter data. This circuit operates to allow only one teletypewriter to input data at a time, on a first come first serve basis as determined by the leading edge of the start bit of a data transmission from a teletypewriter. Multivibrator 10 operates in response to the leading edge of a start bit (transition to logic $\phi$) from teletypewriter 1 to generate a five second timing period. Multivibrator 10 generates a five second enable signal (logic 1) on its Q lead which enables NAND gate 12 to receive data from teletypewriter 1 via inverter 11. Multivibrator 10 also generates a disable signal (logic $\phi$) on its $\bar{Q}$ lead. Multivibrator 20 detects this disable signal on its clear input and operates to generate an inhibit signal (logic $\phi$) on its Q lead. NAND gate 22 responds to this inhibit signal to prevent transmission of data from teletypewriters via inverter 21 and to generate a logic 1 signal. AND gate 30 operates in response to the logic 1 signal from NAND gate 22 and the data from NAND gate 12 to gate this data to the input-output device controller. AND gate 30 will continue to gate data for five seconds at which time multivibrator 10 will time out and turn off the enable signal on its Q lead. NAND gate 12 responds to the absence of the enable signal to prevent transmission of data from teletypewriter 1 via inverter 11. When multivibrator 10 times out it also removes the disable signal on its $\bar{Q}$ lead. Multivibrator 20 operates in response to the absence of the disable signal to allow the leading edge of the start bit of data from teletypewriter 2 to trigger multivibrator 20, should it occur before the start bit of data from teletypewriter 1 triggers multivibrator 10.

Monostable multivibrators 10 and 20 are retriggerable thus allowing extension of the five second timing period. If teletypewriter 1 initiates a subsequent data transmission before termination of its prior five second timing period, retriggerable monostable multivibrator 10 will extend the timing period for an additional five seconds from receipt of the start bit of this new data transmission. Thus once a teletypewriter gains access to a device controller it can retain access to the controller beyond five seconds in order to complete its data transmission uninterrupted.

Thus retriggerable monostable multivibrators provide access timing for multiple teletypewriters connected to a single device controller. While the preferred embodiment shows a circuit using five second timing periods and allowing only two input-output devices to gain access to a device controller, the capability of additional input-output devices to gain access to a device controller can be provided by connecting an additional multivibrator, NAND gate and inverter for each additional input-output device.

It will be obvious to those skilled in the art that numerous modifications of the present invention can be made without departing from the spirit of the invention which shall be limited only by the scope of the claims appended hereto.

What is claimed is:

1. An access circuit for connecting multiple input-output devices to a computer input-output channel for use in a computer system including an input-output channel and a plurality of input-output devices operated to generate data pulses, said access circuit comprising:
    a plurality of monostable multivibrators each connected to an associated one of a plurality of said input-output devices, each of said monostable multivibrators further including a first output, a second output, and a reset input, said first output of each monostable multivibrator connected to said reset input of each other of said monostable multivibrators, a first one of said monostable multivibrators operated in response to a first one of said data pulses from said associated input-output device to generate a reset signal on said first output lead and an enable signal on said second output lead, each other of said monostable multivibrators operated in response to said reset signal from said first monostable multivibrator to prevent generation of an enable signal;
    gating means connected to said plurality of monostable multivibrators and to said associated plurality of input-output devices, operated in response to said enable signal to gate said data pulses from said associated input-output device to said input-output channel.

2. An access circuit as claimed in claim 1, wherein said monostable multivibrators operate in response to said first one of said data pulses to generate said enable signal and said reset signal for a predetermined time.

3. An access circuit as claimed in claim 1, wherein: said monostable multivibrator comprise a retriggerable monostable multivibrator.

4. An access circuit as claimed in claim 1, wherein: said gating means comprise a plurality first gate circuits each connected to an associated monostable multivibrator, operated in response to said enable signal to gate said data pulses from said associated input device; and
    a second gate circuit operated to gate said gated data pulses from said plurality of first gate circuits to said input-output channel.

5. An access circuit as claimed in claim 4, wherein: said first gate circuit comprises an inverter connected to an associated input-output device operated in response to said data pulses to generate inverted data pulses; and
    a "NAND" gate connected to said associated monostable multivibrator and said inverter, operated in response to said enable signal to gate said inverted data pulses.

6. An access circuit as claimed in claim 4, wherein: said second gate circuit comprises an "AND" gate.

* * * * *